United States Patent
Isert et al.

(10) Patent No.: US 10,643,103 B2
(45) Date of Patent: May 5, 2020

(54) METHOD AND APPARATUS FOR REPRESENTING A MAP ELEMENT AND METHOD AND APPARATUS FOR LOCATING A VEHICLE/ROBOT

(71) Applicant: Bayerische Motoren Werke Aktiengesellschaft, Munich (DE)

(72) Inventors: Carsten Isert, Munich (DE); Wanli Jiang, Shanghai (CN); Qianshan Li, Shanghai (CN)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 45 days.

(21) Appl. No.: 15/817,392

(22) Filed: Nov. 20, 2017

(65) Prior Publication Data

US 2018/0165544 A1    Jun. 14, 2018

Related U.S. Application Data

(63) Continuation of application No. PCT/CN2015/081784, filed on Jun. 18, 2015.

(51) Int. Cl.
*G01C 21/36* (2006.01)
*G06K 9/00* (2006.01)
(Continued)

(52) U.S. Cl.
CPC ....... *G06K 9/6251* (2013.01); *G01C 21/3635* (2013.01); *G05D 1/0231* (2013.01); *G06K 9/00664* (2013.01); *G06T 17/10* (2013.01)

(58) Field of Classification Search
CPC ............ G01C 21/3635; G05D 1/0231; G06K 9/00664; G06T 17/10
See application file for complete search history.

(56) References Cited

U.S. PATENT DOCUMENTS

2006/0093187 A1*   5/2006   Mittal .............. G08B 13/19613
                                                 382/103
2006/0177099 A1*   8/2006   Zhu ..................... G06K 9/00335
                                                 382/104
(Continued)

FOREIGN PATENT DOCUMENTS

CN           1569558 A      1/2005
CN         101509781 A      8/2009
CN         101920498 A     12/2010

OTHER PUBLICATIONS

Dongbo et al., "A Robot Self-Localization Method Based on Image Retrieval System", Chinese Journal of Sensors and Actuators, Apr. 30, 2010, pp. 548-550 (five pages total), vol. 23, No. 4, with English abstract.

(Continued)

*Primary Examiner* — Santiago Garcia
(74) *Attorney, Agent, or Firm* — Crowell & Moring LLP

(57) ABSTRACT

A method and an apparatus are provided for representing a map element and for locating a vehicle/robot based thereupon. The method for representing a map element includes: generating a Gaussian Mixture Model for the map element; generating a signature for identifying the map element, wherein the signature includes properties of the map element; and generating a Signatured Gaussian Mixture Model for representing the map element, wherein the Signatured Gaussian Mixture Model includes the Gaussian Mixture Model and the signature.

21 Claims, 8 Drawing Sheets

(51) Int. Cl.
*G06T 17/10* (2006.01)
*G06K 9/62* (2006.01)
*G05D 1/02* (2020.01)

(56) References Cited

U.S. PATENT DOCUMENTS

| | | | | |
|---|---|---|---|---|
| 2013/0336581 A1* | 12/2013 | Datta | ................ | G06K 9/00785 382/165 |
| 2014/0099035 A1* | 4/2014 | Ciarcia | .............. | G06K 9/00637 382/216 |
| 2014/0161334 A1* | 6/2014 | Wang | ................ | G06K 9/00362 382/131 |
| 2017/0053169 A1* | 2/2017 | Cuban | .................... | H04N 7/185 |
| 2017/0193830 A1* | 7/2017 | Fragoso | ............... | G08G 5/0069 |

OTHER PUBLICATIONS

International Search Report (PCT/ISA/210) issued in PCT Application No. PCT/CN2015/081784 dated Mar. 16, 2016 (4 pages).
Written Opinion (PCT/ISA/237) issued in PCT Application No. PCT/CN2015/081784 dated Mar. 16, 2016 (4 pages).

* cited by examiner

100

| generating a Gaussian Mixture Model for a map element |
| 110 |

↓

| generating a signature for identifying the map element, wherein the signature comprises properties of the map element |
| 120 |

↓

| generating a Signatured Gaussian Mixture Model for representing the map element, wherein the Signatured Gaussian Mixture Model comprises the Gaussian Mixture Model, the signature and an existence probability of the map element |
| 130 |

Fig.1

300 reading a Signatured Gaussian Mixture Map for a map section which a vehicle/robot is currently located in, wherein the Signatured Gaussian Mixture Map comprises Signatured Gaussian Mixture Models for map elements within the map section, and wherein the Signatured Gaussian Mixture Models are generated by using the method 100
310 generating Signatured Gaussian Mixture Models for map elements within a real-time point cloud or an image acquired by the vehicle/robot through using the method 100
320 establishing correspondence between the Signatured Gaussian Mixture map and the Signatured Gaussian Mixture Models for map elements within the real-time point cloud or image based on signatures of the Signatured Gaussian Mixture Models for map elements within the real-time point cloud or image
330 matching the Signatured Gaussian Mixture map with the Signatured Gaussian Mixture Models for map elements within the real-time point cloud or image based on the correspondence established
340

Fig.3

METHOD AND APPARATUS FOR REPRESENTING A MAP ELEMENT AND METHOD AND APPARATUS FOR LOCATING A VEHICLE/ROBOT

CROSS REFERENCE TO RELATED APPLICATION

This application is a continuation of PCT International Application No. PCT/CN2015/081784, filed Jun. 18, 2015, the entire disclosure of which is herein expressly incorporated by reference.

FIELD OF THE INVENTION

The present invention relates in general to the field of vehicle/robot localization, and in more particular, to a method and an apparatus for representing a map element and a method and an apparatus for locating a vehicle/robot.

BACKGROUND OF THE INVENTION

The vehicle/robot localization technology has been researched for many years, and many of the proposed benefits have been demonstrated in varied applications. Many categories of maps have been developed and used in vehicle/robot localization, such as a point map which consists of laser points, a grid map which separates the environment into a grid with each grid cell recording whether it is occupied by something as well as the probability of the occupancy, a geometric primitive map which uses one or more types of geometric primitives to represent entities in the environment, a feature map which mainly consists of feature points and their corresponding descriptors extracted from other types of data (e.g., a point cloud, a camera image, etc.), a Normal distribution transform (NDT) map which uses uni-weighted Gaussian Mixture Model to represent the environment, with each Gaussian distribution modeling a unique grid cell of the environment, a Normal distribution transform Occupancy (NDT-OM) map which separates the environment into grid, within each grid cell of which a Gaussian distribution is calculated among the data points in the cell and a weight which represents the occupancy probability of this cell is maintained for the Gaussian distribution.

The existing method and system which are used for a vehicle/robot to locate itself by using sensors like odometry, GPS, laser scanner, camera etc. mainly involve localization based on matching laser points acquired by the vehicle/robot with a grid map, localization based on matching the laser points with a point cloud map, and localization based on matching laser point features with point cloud map features.

SUMMARY OF THE INVENTION

An aspect of the present invention is to provide a novel method and an apparatus for representing a map element.

A further aspect of the present invention is to provide an improved method and an apparatus for localizing vehicle/robot.

In accordance with an exemplary embodiment of the present invention, there is provided a computer-implemented method for representing a map element, comprising: generating a Gaussian Mixture Model for the map element; generating a signature for identifying the map element, wherein the signature comprises properties of the map element; and generating a Signatured Gaussian Mixture Model for representing the map element, wherein the Signatured Gaussian Mixture Model comprises the Gaussian Mixture Model, the signature and an existence probability of the map element.

In accordance with an exemplary embodiment of the present invention, there is provided a computer implemented method for locating a vehicle/robot, comprising: reading a Signatured Gaussian Mixture Map for a map section which the vehicle/robot is currently located in, wherein the Signatured Gaussian Mixture Map comprises Signatured Gaussian Mixture Models for map elements within the map section, and wherein the Signatured Gaussian Mixture Models are generated by using the method for representing a map element; generating Signatured Gaussian Mixture Models for map elements within a real-time point cloud or an image acquired by the vehicle/robot through using the method for representing a map element; establishing one or more correspondences between the Signatured Gaussian Mixture Map and the Signatured Gaussian Mixture Models for map elements within the real-time point cloud or image based on signatures of the Signatured Gaussian Mixture Models for map elements within the real-time point cloud or image; and matching the Signatured Gaussian Mixture Map with the Signatured Gaussian Mixture Models for map elements within the real-time point cloud or image based on the one or more correspondences established.

In accordance with an exemplary embodiment of the present disclosure, there is provided an apparatus for representing a map element, comprising: a memory, having computer executable instructions stored therein; and a processor, coupled to the memory and configured to: generate a Gaussian Mixture Model for the map element; generate a signature for identifying the map element, wherein the signature comprises properties of the map element; and generate a Signatured Gaussian Mixture Model for representing the map element, wherein the Signatured Gaussian Mixture Model comprises the Gaussian Mixture Model, the signature and an existence probability of the map element.

In accordance with an exemplary embodiment of the present disclosure, there is provided an apparatus for locating a vehicle/robot, comprising: a memory, having computer executable instructions stored therein; and a processor, coupled to the memory and configured to: read a Signatured Gaussian Mixture Map for a map section which the vehicle/robot is currently located in, wherein the Signatured Gaussian Mixture Map comprises Signatured Gaussian Mixture Models for map elements within the map section, and wherein the Signatured Gaussian Mixture Models are generated by using the method for representing a map element; generate Signatured Gaussian Mixture Models for map elements within a real-time point cloud or an image acquired by the vehicle/robot through using the method for representing a map element; establish one or more correspondences between the Signatured Gaussian Mixture Map and the Signatured Gaussian Mixture Models for map elements within the real-time point cloud or image based on signatures of the Signatured Gaussian Mixture Models for map elements within the real-time point cloud or image; and match the Signatured Gaussian Mixture Map with the Signatured Gaussian Mixture Models for map elements within the real-time point cloud or image based on the one or more correspondences established.

In accordance with an exemplary embodiment of the present disclosure, there is provided a non-transient storage medium having instructions stored thereon that when executed cause a processor to implement computer-implemented method for representing a map element, comprising:

instructions for causing the processor to generate a Gaussian Mixture Model for the map element; instructions for causing the processor to generate a signature for identifying the map element, wherein the signature comprises properties of the map element; and instructions for causing the processor to generate a Signatured Gaussian Mixture Model for representing the map element, wherein the Signatured Gaussian Mixture Model comprises the Gaussian Mixture Model, the signature and an existence probability of the map element.

In accordance with an exemplary embodiment of the present disclosure, there is provided a non-transient storage medium having instructions stored thereon that when executed cause a processor to implement computer-implemented method for locating a vehicle/robot, comprising: instructions for causing the processor to read a Signatured Gaussian Mixture Map for a map section which the vehicle/robot is currently located in, wherein the Signatured Gaussian Mixture Map comprises Signatured Gaussian Mixture Models for map elements within the map section, and wherein the Signatured Gaussian Mixture Models are generated by using the method for representing a map element; instructions for causing the processor to generate Signatured Gaussian Mixture Models for map elements within a real-time point cloud or an image acquired by the vehicle/robot through using the method for representing a map element; instructions for causing the processor to establish one or more correspondences between the Signatured Gaussian Mixture Map and the Signatured Gaussian Mixture Models for map elements within the real-time point cloud or image based on signatures of the Signatured Gaussian Mixture Models for map elements within the real-time point cloud or image; and instructions for causing the processor to match the Signatured Gaussian Mixture Map with the Signatured Gaussian Mixture Models for map elements within the real-time point cloud or image based on the one or more correspondences established.

Further scope of applicability of the present disclosure will become apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from the following detailed description.

Other objects, advantages and novel features of the present invention will become apparent from the following detailed description of one or more preferred embodiments when considered in conjunction with the accompanying drawings.

BRIEF DESCRIPTION OF THE DRAWINGS

The above and other aspects and advantages of the present disclosure will become apparent from the following detailed description of exemplary embodiments taken in conjunction with the accompanying drawings which illustrate, by way of example, the principles of the disclosure.

FIG. 1 illustrates a high level flow chart showing a method for representing a map element in accordance with an exemplary embodiment of the present disclosure;

FIG. 3 illustrates a flow chart showing a method for locating vehicle/robot in accordance with an exemplary embodiment of the present disclosure;

DETAILED DESCRIPTION OF THE DRAWINGS

Figure 2A:
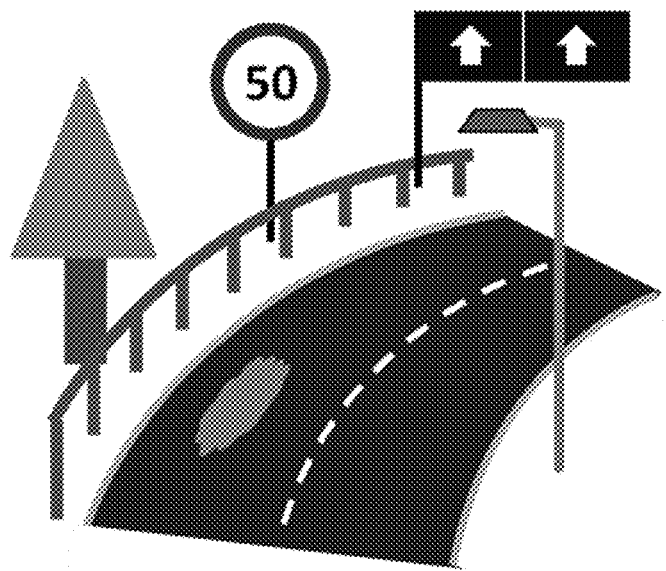
FIGS. 2A-2G show illustrative diagrams of a portion of a ground truth, a portion of a digital transportation map corresponding to that portion of the ground truth, a Signatured Gaussian Mixture Map obtained by representing map elements in that portion of the digital transportation map through using the method for representing a map element, a point cloud with point clusters, Signatured Gaussian Mixture Models for point clusters within the point cloud obtained by representing the point clusters through using the method for representing a map element, an image with several segments obtained by a vehicle/robot, and an illustrative diagram obtained by representing segments in the image through using the method for representing a map element, respectively.

In the following detailed description, numerous specific details are set forth to provide a thorough understanding of the described exemplary embodiments. It will be apparent, however, to one skilled in the art that the described embodiments can be practiced without some or all of these specific details. In other exemplary embodiments, well known structures or process steps have not been described in detail in order to avoid unnecessarily obscuring the concept of the present disclosure.

A general idea of the present disclosure is to provide a novel method and an apparatus for representing map elements. Another aspect of the present disclosure is to provide an improved vehicle/robot localization method and an apparatus.

Referring first to FIG. 1, there is shown a high level flow chart of a computer-implemented method 100 for representing a map element in accordance with an exemplary embodiment of the present disclosure.

The method 100 starts with generating 110 a Gaussian Mixture Model for the map element. As used herein, a map element may be a geometry or point cluster in a digital map or an image segment in an image. The digital map may comprise a digital transportation map or a point cloud map. Alternatively, the map element may be a point cluster in a real-time point cloud or an image segment in an image (such as a camera image) acquired by a vehicle/robot. The digital map may comprise geometric information of the map element or other information which can be used to determine the geometric information of the map element (such as category information thereof). The map element may correspond to a physical object in the physical world.

Moreover, the geometry, point cluster, or image segment may be a shape which can be approximated by geometric primitives alone or in combination. For example, a map element in a digital transportation map may be a geometry in the map which may correspond to a speed limit board in the physical world. The shape of the geometry may approximate to that of a circle primitive as the body of the board and a line segment primitive as the post thereof. As another example, a map element in a point cloud map or a real-time point cloud may be a point cluster which may correspond to a tree along the road in the physical world. The shape of the point cluster may approximate to that of a rectangle primitive as the trunk of the tree and a triangle primitive as the crown of the tree. As another example, the shape of a map element in an image may be an image segment which may correspond to a tree along the road in the physical world. The shape of the image segment may approximate to that of a rectangle primitive as the trunk of the tree and a triangle primitive as the crown of the tree.

It is contemplated that point clusters in a point cloud can be generated by using any already existing or further developed cluster method, such as region growing, K-means, etc. Geometric information of the point cluster can be determined from relative location relationship between data points within the point cluster, such as the distance between the data points.

It is also contemplated that the image segment in an image can be generated by using any already existing or further developed image segmentation method, such as region growing, k-means, Markov Random Field, etc.

In an example, the geometric primitives may comprise at least one of: a line segment, an arc segment, a spiral segment, a planar rectangle, a planar triangle, a planar circle/sphere, a planar ellipse, a sphere surface patch, a cylinder surface patch, a 3D cube, a 3D sphere and a 3D cylinder. It is known that any geometry can be represented by geometric primitives alone or in combination.

Moreover, as used herein, a Gaussian Mixture Model is a type of density model which comprises a number of Gaussian distributions. For example, a typical Gaussian Mixture Model in one dimension may take the form of formula (1) as below:

$$p(x) = \sum_{k=1}^{K} \pi_k p(x|k) \quad (1)$$

wherein K is the number of Gaussian distributions contained in the Gaussian Mixture Model, $\pi k$ is the composition weight of the kth Gaussian distribution, and p (x|k) is the probability density function of the kth Gaussian distribution which is defined by its average $\mu k$ and covariance bk. In particular, a typical Gaussian distribution (i.e., the probability density function of the Gaussian distribution) in one dimension may take the form of formula (2) as below:

$$p(x) = \frac{1}{\sqrt{2\pi}} \exp\left(-\frac{(x-\mu)^2}{2\sigma^2}\right) \quad (2)$$

wherein $\mu k$ is the average, and pk is the covariance.

Thus, generating a Gaussian Mixture Model for a map element may involve the process of determining (a) the number of Gaussian distributions contained in the Gaussian Mixture Model, (b) the composition weight of each Gaussian distribution in the Gaussian Mixture Model, (c) as well as the average $\mu k$ and the covariance tk parameters for each Gaussian distribution, given the data points which are deemed as satisfying the Gaussian Mixture Model.

Herein, only an example form of a Gaussian Mixture Model and an example form of a Gaussian distribution in one dimension are illustrated. However, Gaussian Mixture Models in two and three dimensions are in similar forms and well known to those skilled in the art.

According to the definition of Gaussian distributions, it is known that the geometric shape of a Gaussian distribution in a two dimensional space resembles that of an ellipse, and that the geometric shape of a Gaussian distribution in a three dimensional space resembles that of an ellipsoid.

In an example, the Gaussian Mixture Model for the map element may be generated by using Gaussian Mixture Models of geometric primitives to approximate a shape of the map element. It is noted that the shape of the map element may be determined by using the geometric information of the map element or other information of the map element (e.g., category information thereof) and that such information may be obtained from the digital map. The Gaussian Mixture Model for the map element may be generated by using Gaussian Mixture Models for geometric primitives alone or in combination. As an example, a map element has a shape approximating that of a planar ellipse primitive may be generated by using the Gaussian Mixture Model for the planar ellipse primitive based on geometric parameters of the map element. As another example, a map element has a shape approximating that of a triangle primitive and a line segment primitive may be generated by using the combination of a Gaussian Mixture Model for the triangle primitive and a Gaussian Mixture Model for the line segment primitive based on geometric parameters of the map element.

A Gaussian Mixture Model of a geometric primitive may comprise one or more Gaussian distributions, with each Gaussian distribution having a specific mean, a covariance and a composition weight. The number of Gaussian distributions in the Gaussian Mixture Model may be selected based on accuracy requirement. The Gaussian Mixture Models for geometric primitives may be expressed by the geometric parameters of the geometric primitives. Herein, take a line segment primitive with length "l" as an example. If it is determined that one Gaussian distribution is used to represent the line segment primitive, the mean for the Gaussian distribution is the center of the line segment. That is, the mean may be expressed as a function of the length "l" of the line segment primitive. Similarly, the covariance of the Gaussian distribution also can be expressed by the geometric parameter of the line segment primitive (for example, length "l" in this example). Additionally, as there is merely one Gaussian distribution in the Gaussian Mixture Model, the composition weight of the Gaussian distribution is 1.

Then the Gaussian Mixture Models for map elements may be generated for example via a substitution method, i.e., by substituting geometric parameters of geometric primitives for concrete geometric parameters of the map elements. In the case that a map element has a shape approximating that of several geometric primitives in combination, generating the Gaussian Mixture Model for the map element may also comprise combining Gaussian Mixture Models for the geometric primitives to generate the Gaussian Mixture Model for the map element. In an example, area ratios between sub-elements of the map element represented by respective Gaussian Mixture Models of geometric primitives to area of the map element may be used as weights of the respective Gaussian Mixture Models of geometric primitives, thereby forming the Gaussian Mixture Model for the map element.

The Gaussian Mixture Models of geometric primitives may be calculated before-hand and stored for subsequent use, thereby improving computational efficiency in generating Gaussian Mixture Models for map elements.

In an example, calculating a Gaussian Mixture Model of a geometric primitive may comprises sampling the geometric primitive and then using data points resulting from the sampling to determine parameters of each Gaussian distribution, such as the specific mean, covariance and composition weight thereof. For example, the specific mean, covariance and composition weight of the Gaussian distribution may be calculated for example by using Expectation Maximization (EM) Algorithm.

Alternatively, when calculating the Gaussian Mixture Model of a geometric primitive belonging to planar or cube primitives, the boundary of the geometric primitive may be used to generate a quadtree or octree partition of the geometric primitive. Then a Gaussian distribution may be put into each blank cell which is located within the geometric primitive, thereby forming the Gaussian Mixture Model of the geometric primitive. The number of partitions, that is, the number of Gaussian distributions within the Gaussian Mixture Model may depend on accuracy requirement. It is clear that the mean of each Gaussian distribution put into each black cell is the center of the blank cell. Moreover, the covariance of each Gaussian distribution can be determined based on the geometric parameters of the corresponding black cell. Additionally, the composition weights of Gaussian distributions may be determined by the area ratios between corresponding black cells.

It is contemplated that Gaussian Mixture Models in several accuracy levels may be calculated for a geometric primitive and stored for later use. Taking a triangle primitive as an example, through using the quadtree algorithm, the triangle primitive may be expressed by a Gaussian Mixture Model with one Gaussian distribution, a Gaussian Mixture Model with four Gaussian distributions, or a Gaussian Mixture Model with eleven Gaussian distributions, which may depend on accuracy requirement.

In another example, the Gaussian Mixture Model for a point cluster or image segment may also be calculated by using the boundary of the point cluster or image segment to generate a quadtree partition of the cluster or segment, and then putting a Gaussian distribution into each blank cell which is located within the point cluster or image segment. As an alternative, the Gaussian Mixture Model for a point cluster may be generated by using points within the point cluster to calculate the Gaussian Mixture Model thereof, for example by using EM method.

Then a signature for identifying the map element may be generated 120, wherein the signature comprises properties of the map element. For example, the properties of the map element may comprise type, reflectivity or flatness of the map element. In an example, the signature may be constructed as a vector comprising the properties of the map element. It is also contemplated that properties other than those mentioned above can be used to construct the signature.

Subsequently, a Signatured Gaussian Mixture Model for representing the map element may be generated 130, wherein the Signatured Gaussian Mixture Model may comprise the Gaussian Mixture Model, the signature and an existence probability of the map element. Herein, the existence probability is a statistic concept. That is, for one observation, the existence probability for a map element is 1 or 0, and for more than one observation, the existence probability is a probability in the range from 0 to 1. The existence probability of the map element may be known in advance or be estimated by using data points observed. For example, the existence probability of the map element may be obtained from the digital map, or may be estimated by using multiple observations available. With the existence probability, it is able to represent dynamic map elements.

It is contemplated that the data required for generating the Gaussian Mixture Model (e.g., data used to compute the specific mean, covariance and composition weight of each Gaussian distribution of the Gaussian Mixture Model, data used to determine the shape of the map element, etc), the signature and/or existence probability of the map element can be obtained from data sources, such as obtained from digital transportation map or point cloud map suppliers, or obtained by vehicle/robot in real-time. The digital transportation map may be commercially available maps, such as Google map, HERE map, street view maps, etc. Moreover, the point cloud may be a dense point cloud acquired for example by a velodyne's LiDAR laser system, or a sparse point cloud acquired for example by one or more ibeo laser scanners etc.

Representing the map element with the Signatured Gaussian Mixture Model will reduce the storage requirement as well as improve tolerance on noise.

The Signatured Gaussian Mixture Models of the map elements can be combined to form a Signatured Gaussian Mixture Map, with the existence probabilities of the map elements as existence weights of the corresponding Signatured Gaussian Mixture Models.

FIGS. 2A-2G show illustrative diagrams of a portion of a ground truth, a portion of a digital transportation map corresponding to that portion of the ground truth, a Signatured Gaussian Mixture Map obtained by representing map elements in that portion of the digital transportation map through using the method 100, a point cloud with point clusters, and Signatured Gaussian Mixture Models for point clusters within the point cloud obtained by representing the point clusters through using the method 100, an image with several segments (i.e., map elements) obtained by a vehicle/robot, and an illustrative diagram obtained by representing segments in the image through using the method 100, respectively.

Figure 2B:
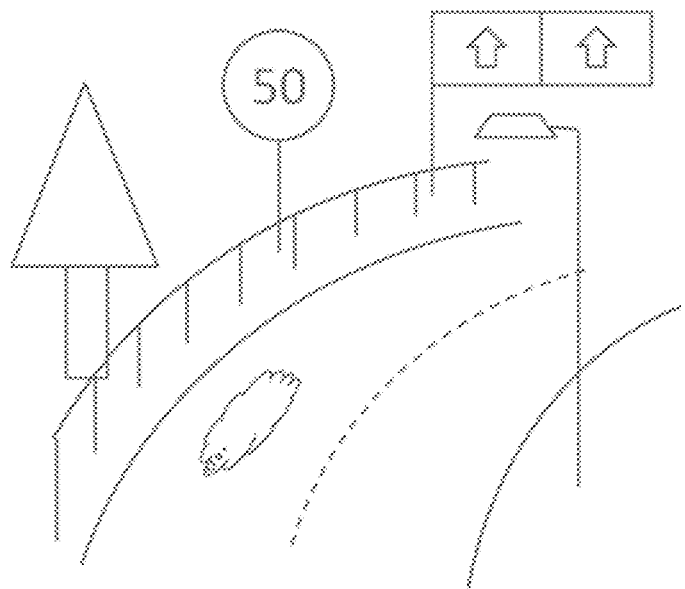
Figure 2C:
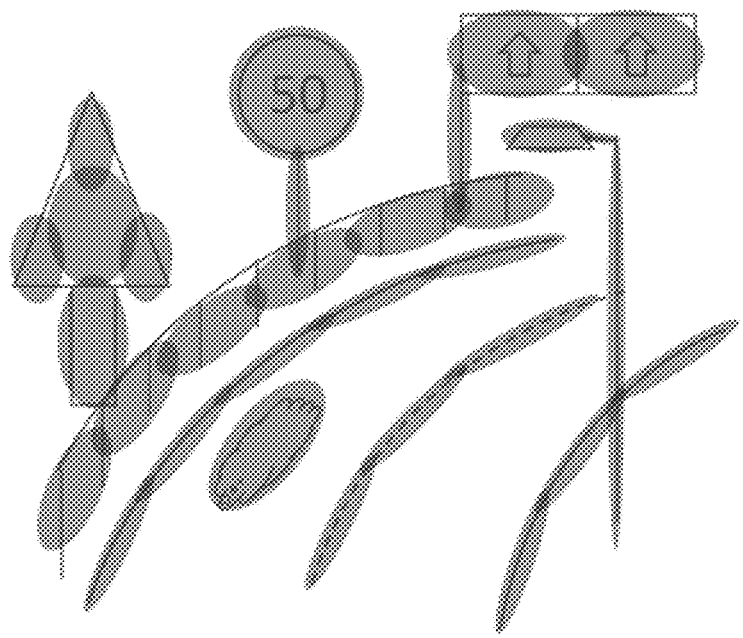

FIG. 2A shows a portion of a ground truth with several objects, such as a tree with a crown and a trunk, a speed limit board with a post, a directional board with a post, a road lamp with a post and a holder etc. FIG. 2B shows a portion of a digital transportation map for that portion of the ground truth. FIG. 2C shows an illustrative diagram of representing map elements in that portion of the digital transportation map through using the method 100.

As shown in FIG. 2C, the speed limit board is represented by a Gaussian Mixture Model with two Gaussian distributions, i.e., one for the body of the board and the other for the post, the tree is represented by a Gaussian Mixture Model with five Gaussian distributions, i.e., four for the crown of tree and one for the trunk of the tree, the road lamp has been represented by a Gaussian Mixture Model with three Gaussian distributions, i.e., one for the body of lamp and the other two for the post and the holder, and the direction sign board is represented by a Gaussian Mixture Model with three Gaussian distributions, i.e., one for the post and the other two for the body of the board.

Figure 2D:
Figure 2E:
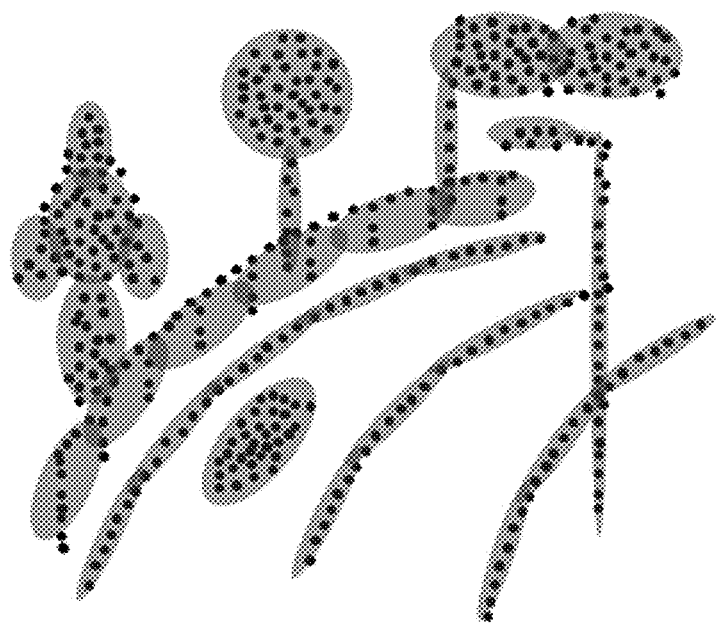

FIG. 2D shows a point cloud with several point clusters. The point cloud may be obtained by a vehicle/robot. FIG. 2E shows an illustrative diagram of representing point clusters in the point cloud through using the method 100. As shown in FIG. 2E, point clusters in the point cloud have been represented by Gaussian Mixture Models respectively.

Figure 2F:
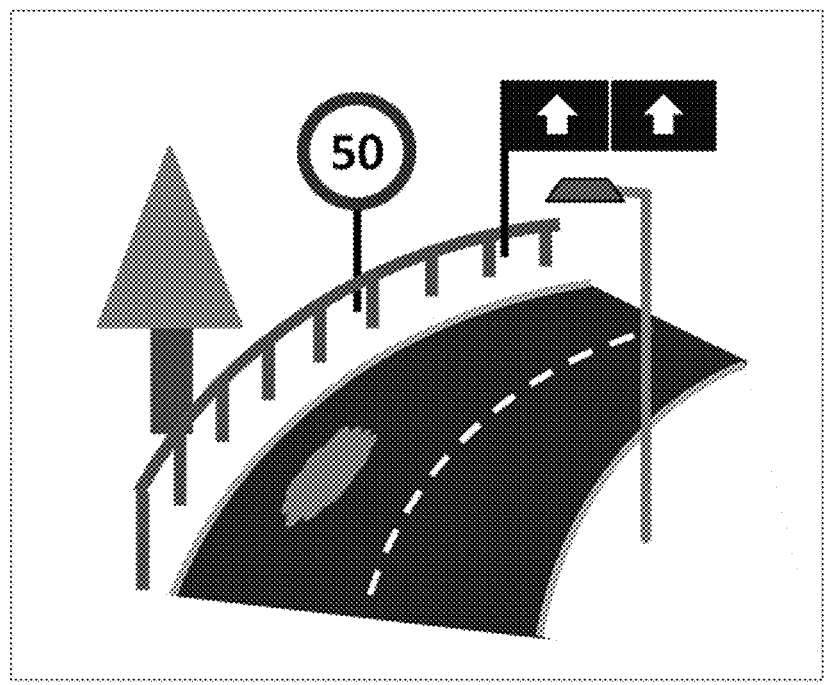
Figure 2G:
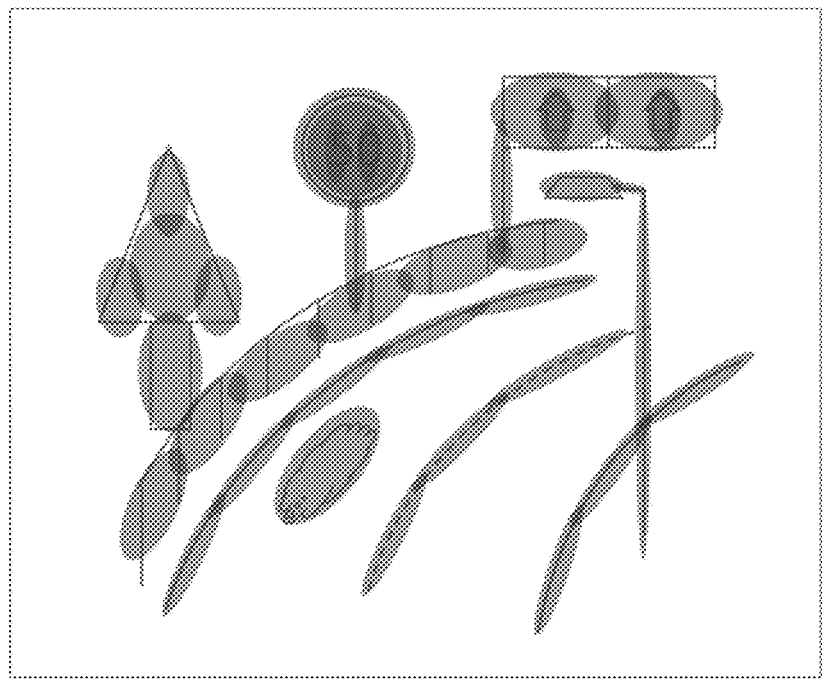

FIG. 2F shows an image with several segments (i.e., map elements). The image may be obtained by a vehicle/robot, for example, via a camera of the vehicle/robot. FIG. 2G shows an illustrative diagram of representing segments in the image through using the method 100. As shown in FIG. 2G, segments in the image have been represented by Gaussian Mixture Models respectively.

Although not shown in FIG. 2C, FIG. 2E and FIG. 2G, it is also contemplated that signatures of map elements (including point clusters) can be displayed on the diagrams.

It is also note that the images and Signatured Gaussian Mixture Models for map elements therein are 2D, while the point cloud, the point cloud map, the digital transportation map and Signatured Gaussian Mixture Models for map elements therein are 3D.

Now a computer implemented method for locating a vehicle/robot will be discussed with reference to FIG. 3, which is a flow chart illustrating a process 300 for locating a vehicle/robot.

As shown at 310, a Signatured Gaussian Mixture Map for a map section which the vehicle/robot is currently located in is read, wherein the Signatured Gaussian Mixture Map comprises Signatured Gaussian Mixture Models for map elements within the map section, and wherein the Signatured Gaussian Mixture Models for the map elements may be generated by using the method 100. It is contemplated that the Signatured Gaussian Mixture Map for that map section may be read from an apparatus which may be, for example, the vehicle/robot itself or a server in communication with the vehicle/robot.

In an example, information identifying the map section which the vehicle/robot is currently located in may be read in order to read the Signatured Gaussian Mixture Map for that map section. For example, the information identifying the map section which the vehicle/robot is currently located in may be read from an apparatus which may be, for example, the vehicle/robot itself or a server in communication with the vehicle/robot, such that the Signatured Gaussian Mixture Map for that map section can be read accordingly. It is contemplated that the Signatured Gaussian Mixture Map can be generated in advance for example by a server in communication with the vehicle/robot and that the Signatured Gaussian Mixture Map corresponding to the map section in which the vehicle/robot is deemed to be currently located in may be sent to the vehicle/robot after information identifying that map section is obtained. It is also contemplated that the Signatured Gaussian Mixture Map for that map section may be generated by the vehicle/robot after information identifying that map section as well as data required to construct the Signatured Gaussian Mixture Map for that map section is obtained. For example, after determining the map section which the vehicle/robot is currently located in and obtaining a subpart of a digital transportation map which corresponds to that map section, the vehicle/robot can generate the Signatured Gaussian Mixture Map for that map section accordingly.

As a concrete example, if it is determined that the vehicle/robot is currently located at XX city, XXX road, No. XXXX (for example, by GPS, IMU, Odometry, etc), then a circular map section which has radius of 1 km and encloses the current location XX city, XXX road, No. XXXX will be identified as the map section in which vehicle/robot is currently located. Subsequently, the Signatured Gaussian Mixture Map for that map section may be read. It should be noted that the shape of the map section as well as geometric parameters of the map section can be specified by users or determined by the vehicle/robot automatically.

As shown at 320, Signatured Gaussian Mixture Models for map elements (i.e., point clusters or image segments) within a real-time point cloud or an image acquired by the vehicle/robot is generated by using the method 100. The real-time point cloud or image can be obtained by the vehicle/robot through using for example a velodyne's LiDAR laser system, an IBEO laser scanner, grey/color, mono/stereo cameras, etc. It is also contemplated that other devices can be used to acquire the real-time point cloud or image.

As shown at 330, one or more correspondences between the Signatured Gaussian Mixture Map and the Signatured Gaussian Mixture Models for map elements within the real-time point cloud or image may be established based on signatures of the Signatured Gaussian Mixture Models for map elements within the real-time point cloud or image. In particular, establishing the one or more correspondences based on the signatures may comprise determining the similarity of the signatures.

In an example, a signature of the Signatured Gaussian Mixture Model of a map element within the real-time point cloud or image may be compared with a signature of the Signatured Gaussian Mixture Model of a map element within the Signatured Gaussian Mixture Map to determine their similarity. As stated above, the signatures may be constructed as vectors. Thus, metrics used to determine the similarity of vectors (such as a distance) can be used to match signatures.

For example, for each map element within the real-time point cloud or image, the signature thereof may be compared with signatures of the Signatured Gaussian Mixture Models of the map elements within the Signatured Gaussian Mixture Map, in order to find a possible matching signature. After determining matching signatures, the correspondence between the Signatured Gaussian Mixture Map and the Signatured Gaussian Mixture Models for map elements within the real-time point cloud or image can be established based thereupon.

It is possible that a map element within the real-time point cloud or image may be deemed as corresponding to more than one map elements in the Signatured Gaussian Mixture Map based on comparison of the signatures. Alternatively, more than one map elements in the real-time point cloud or image may be deemed as corresponding to one map element in the Signatured Gaussian Mixture Map. It is also possible that one or more map elements within the real-time cloud or image may do not have a matching map element in the Signatured Gaussian Mixture Map. For each possibility, a possible correspondence is established, thereby resulting in several possible correspondences between the Signatured Gaussian Mixture Map and the Signatured Gaussian Mixture Models for map elements within the real-time point cloud or image.

As an example, in one correspondence, map elements a, b, c, d and e in the real-time point cloud or image may be deemed as corresponding to map elements A, B, C, D and E in the Signatured Gaussian Mixture Map respectively. While in another correspondence, map elements a and b may be deemed as corresponding to the map element A, while other map elements are deemed as mismatched.

As shown at 340, the Signatured Gaussian Mixture Map and the Signatured Gaussian Mixture Models for map elements within the real-time point cloud or image may be matched based on the one or more correspondences established at 330. If only one correspondence is established at step 330, then the Signatured Gaussian Mixture Map and the Signatured Gaussian Mixture Models for map elements within the real-time point cloud or image may be matched directly.

If more than one correspondence are established at 330, then matching the Signatured Gaussian Mixture Map with the Signatured Gaussian Mixture Models for map elements within the real-time point cloud or image may comprise determining the similarity of the Signatured Gaussian Mixture Models for map elements within the Signatured Gaussian Mixture Map and the Signatured Gaussian Mixture Models for corresponding map elements within the real-time point cloud or image based on the one or more correspondences established at 330.

In an example, a Euclidean distance is used as a metric for determining the similarity of the Signatured Gaussian Mixture models. Herein, the Euclidean distance refers to real distance between two points in m dimensional space, wherein m can be an integral equal or larger than 1.

Then matching the Signatured Gaussian Mixture Map with the Signatured Gaussian Mixture Models for map elements within the real-time point cloud or image comprises: optimizing a Euclidean distance between the Signatured Gaussian Mixture Map and the Signatured Gaussian Mixture Models for map elements within the real-time point cloud or image. In an example, the optimization may involve the following operations.

For each correspondence established in 330, a Euclidean distance between each Signatured Gaussian Mixture Model of the map elements within the Signatured Gaussian Mixture Map and that of the corresponding map element within the real-time point cloud or image (as indicated in the correspondence) is calculated, thereby resulting in a set of Euclidean distances.

Then a sum of the set of Euclidean distances may be defined as a Euclidean distance between the Signatured Gaussian Mixture Map and the Signatured Gaussian Mixture Models for map elements within the real-time point cloud or image. Alternatively, a weighted sum of the set of Euclidean distances may be defined as the Euclidean distance between the Signatured Gaussian Mixture Map and the Signatured Gaussian Mixture Models for map elements within the real-time point cloud or image, with the weight being the existence probability of the Signatured Gaussian Mixture Model within the Signatured Gaussian Mixture Map. Herein, the sum or weighted sum of the set of Euclidean distances calculated for each correspondence is defined as the Euclidean distance between the Signatured Gaussian Mixture Map and the Signatured Gaussian Mixture Models for map elements within the real-time point cloud or image. However, it is also contemplated that other combination of the set of Euclidean distances calculated for each correspondence may be defined as the Euclidean distance between the Signatured Gaussian Mixture Map and the Signatured Gaussian Mixture Models for map elements within the real-time point cloud or image.

The correspondence resulting in a minimum of the Euclidean distance between the Signatured Gaussian Mixture Map and the Signatured Gaussian Mixture Models for map elements within the real-time point cloud or image may be deemed as an acceptable correspondence. Based on said correspondence, the Signatured Gaussian Mixture Models for map elements within the real-time point cloud or image are matched with Signatured Gaussian Mixture Map, and a localization result of the vehicle/robot can be obtained based on the correspondence.

It is also contemplated that metrics other than the Euclidean distance, such as a Manhattan Distance can be used to match the Signatured Gaussian Mixture Map with the Signatured Gaussian Mixture Models for map elements within the real-time point cloud or image.

Additionally, as stated above, the images and Signatured Gaussian Mixture Models for map elements therein are 2D, while the point cloud, the point cloud map, the digital transportation map and Signatured Gaussian Mixture Models for map elements therein are 3D. Thus, when matching map elements having 2D Signatured Gaussian Mixture Models with 3D point cluster, point cluster map or digital transportation map or map elements thereof, spatial constrains may be added to solve the 2D-3D matching.

In an example, the method 300 may further comprise reading information on prior pose of the vehicle/robot and data reflecting the uncertainty area of the prior pose. Then optimizing the Euclidean distance between the Signatured Gaussian Mixture Map and the Signatured Gaussian Mixture Models for map elements within the real-time point cloud or image may comprise: optimizing the Euclidean distance with pose of the vehicle/robot constrained on predefined space and within the uncertainty area. The predefined space may be for example SE (3) space, i.e., a 6 dimensional Euclidean space.

In an example, the information on prior pose of the vehicle/robot and data reflecting the uncertainty area of the prior pose may be determined by the server and sent to the vehicle/robot or determined by the vehicle/robot itself. For example, the vehicle/robot may use GPS/IMU and Odometry to estimate a prior pose of the vehicle/robot and data reflecting the uncertainty area of the prior pose. As used herein, pose means location/position and orientation.

According to an exemplary embodiment of the present disclosure, there is provided an apparatus for representing a map element in accordance with an exemplary embodiment of the present disclosure. The apparatus for representing a map element may comprise a memory, having computer executable instructions stored therein; and a processor, coupled to the memory and configured to: generate a Gaussian Mixture Model for the map element; generate a signature for identifying the map element, wherein the signature comprises properties of the map element; and generating a Signatured Gaussian Mixture Model for representing the map element, wherein the Signatured Gaussian Mixture Model comprises the Gaussian Mixture Model, the signature and an existence probability of the map element.

In an example, the map element is a geometry or point cluster in a digital map or an image segment in an image. In particular, the geometry, point cluster, or image segment has shape approximating that of geometric primitives alone or in combination.

In an example, generating a Gaussian Mixture Model for the map element comprises: using Gaussian Mixture Models of geometric primitives to approximate a shape of the map element.

In an example, the geometric primitives comprise at least one of: a line segment, an arc segment, a spiral segment, a planar rectangle, a planar triangle, a planar circle/sphere, a planar ellipse, a sphere surface patch, a cylinder surface patch, a 3D cube, a 3D sphere and a 3D cylinder.

In an example, the properties of the map element comprise type, reflectivity or flatness of the map element.

According to an exemplary embodiment of the present disclosure, there is provided an apparatus for locating vehicle/robot in accordance with an exemplary embodiment of the present disclosure. The apparatus for locating vehicle/robot may, for example, be a client device in communication with a server. For example, the apparatus for locating vehicle/robot may be amounted on the vehicle/robot. The apparatus for locating a vehicle/robot may comprise: a memory, having computer executable instructions stored therein; and a processor, coupled to the memory and configured to: read a Signatured Gaussian Mixture Map for a map section which the vehicle/robot is currently located in, wherein the Signatured Gaussian Mixture Map comprises Signatured Gaussian Mixture Models for map elements within the map section, and wherein the Signatured Gaussian Mixture Models are generated by using the method 100; generate Signatured Gaussian Mixture Models for map elements within a real-time point cloud or an image acquired by the vehicle/robot through using the method 100; establish one or more correspondences between the Signatured Gaussian Mixture Map and the Signatured Gaussian Mixture Models for map elements within the real-time point cloud or image based on signatures of the Signatured Gaussian Mixture Models for map elements within the real-time point cloud or image; and match the Signatured Gaussian Mixture Map with the Signatured Gaussian Mixture Models for map elements within the real-time point cloud or image based on the one or more correspondences established.

In an example, the processor is further configured to: read information identifying the map section which the vehicle/robot is currently located in.

In an example, the processor is further configured to: read information on prior pose of the vehicle/robot and data reflecting the uncertainty area of the prior pose.

In an example, matching the Signatured Gaussian Mixture Map with the Signatured Gaussian Mixture Models for map elements within the real-time point cloud or image comprises: optimizing the Euclidean distance between the Signatured Gaussian Mixture Map and the Signatured Gaussian Mixture Models for map elements within the real-time point cloud or image.

In an example, optimizing the Euclidean distance between the Signatured Gaussian Mixture Map and the Signatured Gaussian Mixture Models for map elements within the real-time point cloud or image comprises: optimizing the Euclidean distance with pose of the vehicle/robot constrained on predefined space and within the uncertainty area.

Figure 4:
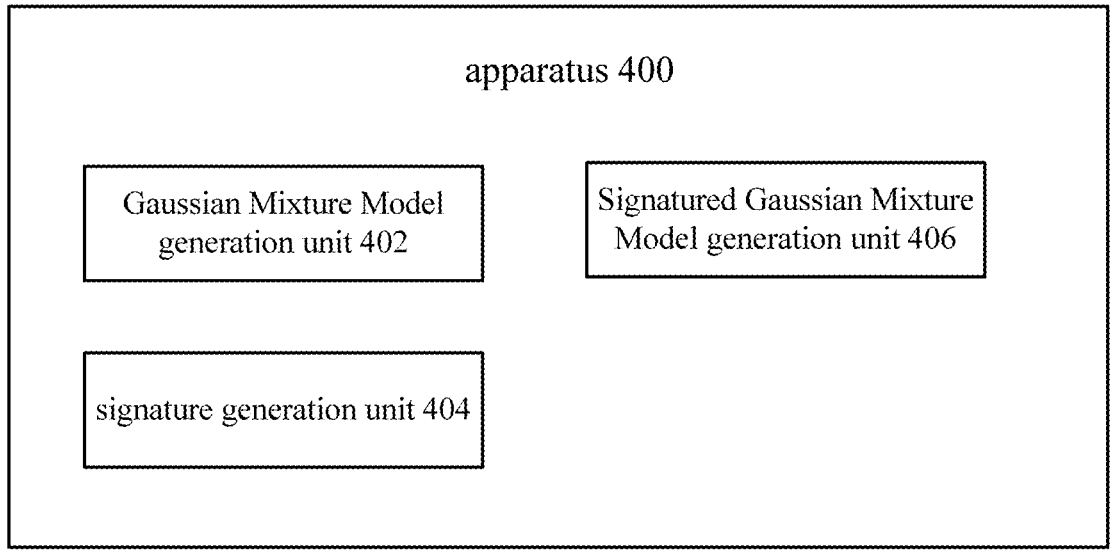
FIG. 4 illustrates an apparatus for representing a map element in accordance with an exemplary embodiment of the present disclosure.

FIG. 4 illustrates an apparatus 400 for representing a map element in accordance with an exemplary embodiment of the present disclosure. The apparatus 400 may comprise a Gaussian Mixture Model generation unit 402, configured to generate a Gaussian Mixture Model for the map element; a signature generation unit 404, configured to generate a signature for identifying the map element, wherein the signature comprises properties of the map element; and a Signatured Gaussian Mixture Model generation unit 406, configured to generate a Signatured Gaussian Mixture Model for representing the map element, wherein the Signatured Gaussian Mixture Model comprises the Gaussian Mixture Model, the signature and an existence probability of the map element.

It is noted that the Gaussian Mixture Model generation unit 402, the signature generation unit 404 and the Signatured Gaussian Mixture Model generation unit 406 of the apparatus 400 can be configured to perform corresponding operations in method 100, and such operations are omitted herein. Additionally, the descriptions directed to method 100 are equally applicable to the apparatus 400.

The apparatus 400 may, for example, be a server in communication with a client device.

Figure 5:
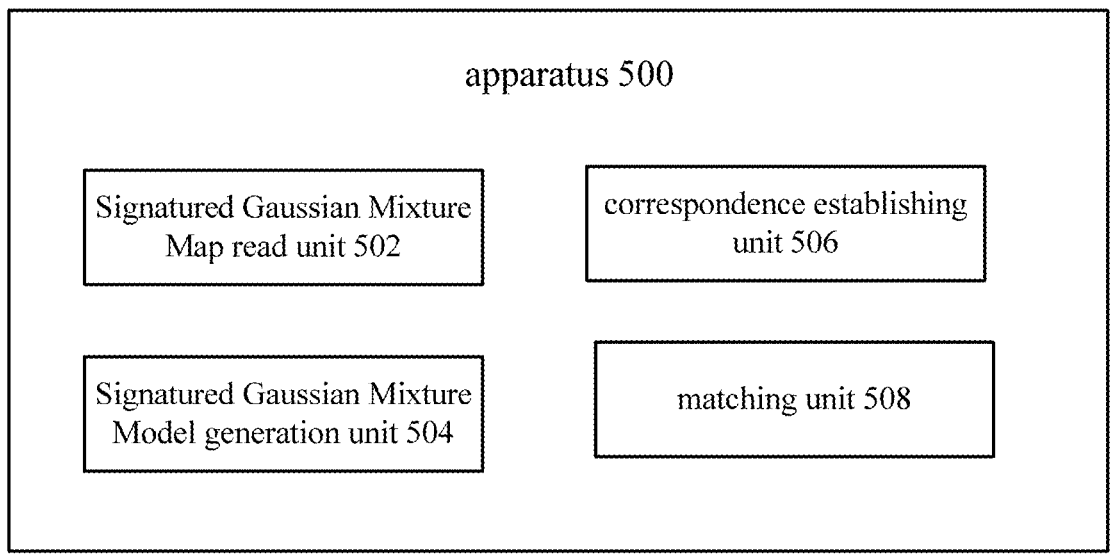
FIG. 5 illustrates an apparatus for locating vehicle/robot in accordance with an exemplary embodiment of the present disclosure.

FIG. 5 illustrates an apparatus 500 for locating vehicle/robot in accordance with an exemplary embodiment of the present disclosure. The apparatus for locating a vehicle/robot may comprise: a Signature Gaussian Mixture Map read unit 502, configured to read Signature Gaussian Mixture Map for a map section which the vehicle/robot is currently located in, wherein the Signatured Gaussian Mixture Map comprises Signatured Gaussian Mixture Models for map elements within the map section, and wherein the Signatured Gaussian Mixture Models are generated by using the method according to method 100; a Signatured Gaussian Mixture Model generation unit 504, configured to generate Signatured Gaussian Mixture Models for map elements within a real-time point cloud or an image acquired by the vehicle/robot using the method according to method 100; a correspondence establishing unit 506, configured to establish one or more correspondences between the Signatured Gaussian Mixture Map and the Signatured Gaussian Mixture Models for map elements within the real-time point cloud or image based on signatures of the Signatured Gaussian Mixture Models for map elements within the real-time point cloud or image; and a matching unit 508, configured to match the Signatured Gaussian Mixture Map with the Signatured Gaussian Mixture Models for map elements within the real-time point cloud or image based on the one or more correspondences established.

It is noted that the Signature Gaussian Mixture Map read unit 502, the Signatured Gaussian Mixture Model generation unit 504, the correspondence establishing unit 506 and the matching unit 508 of the apparatus 500 can be configured to perform corresponding operations in method 300, and such operations are not detailed herein. Additionally, the descriptions directed to method 300 are equally applicable to the apparatus 500.

The apparatus 500 may be, for example, a client device in communication with a server.

Figure 6:
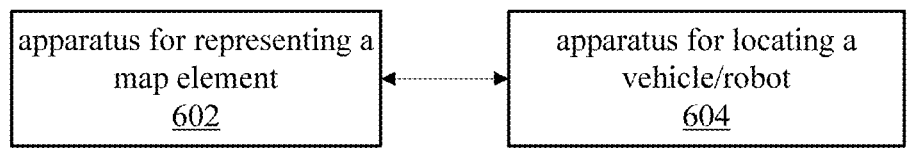
FIG. 6 is a diagram illustrating the connection between an apparatus for representing a map element and an apparatus for locating a vehicle/robot.

FIG. 6 is a diagram illustrating the connection between an apparatus for representing a map element 602 and an apparatus for locating a vehicle/robot 604. As shown in FIG. 6, the apparatus for representing a map element 602 and the apparatus for locating a vehicle/robot 604 can connect with each other, thereby enabling exchange of information therebetween. It is noted that the apparatus for representing a map element 602 can be any apparatus for representing map element as described above, and that the apparatus for representing a map element 602 may be a server. Additionally, it is noted the apparatus for locating a vehicle/robot 604 can be any apparatus for locating a vehicle/robot as described above, and that the apparatus for locating a vehicle/robot 604 may be a client device.

Moreover, although shown as separate devices, it is also contemplated that in some embodiments, the apparatus for representing map element 602 and the apparatus for locating vehicle/robot 604 may be implemented within a single device.

In accordance with an embodiment of the disclosure, a non-transient storage medium having instructions stored thereon that when executed cause a processor to implement computer-implemented method for representing a map element, comprising: instructions for causing the processor to generate a Gaussian Mixture Model for the map element; instructions for causing the processor to generate a signature for identifying the map element, wherein the signature comprises properties of the map element; and instructions for causing the processor to generate a Signatured Gaussian Mixture Model for representing the map element, wherein the Signatured Gaussian Mixture Model comprises the Gaussian Mixture Model, the signature and an existence probability of the map element.

In accordance with an embodiment of the disclosure, a non-transient storage medium having instructions stored thereon that when executed cause a processor to implement computer-implemented method for locating a vehicle/robot, comprising: instructions for causing the processor to read a Signatured Gaussian Mixture Map for a map section which the vehicle/robot is currently located in, wherein the Signatured Gaussian Mixture Map comprises Signatured Gaussian Mixture Models for map elements within the map section, and wherein the Signatured Gaussian Mixture Models are generated by using the method 100; instructions for causing the processor to generate Signatured Gaussian Mixture Models for map elements within a real-time point cloud or an image acquired by the vehicle/robot through using the method 100; instructions for causing the processor to establish one or more correspondences between the Signatured Gaussian Mixture Map and the Signatured Gaussian Mixture Models for map elements within the real-time point cloud or image based on signatures of the Signatured Gaussian Mixture Models for map elements within the real-time point cloud or image; and instructions for causing the processor to match the Signatured Gaussian Mixture Map with the Signatured Gaussian Mixture Models for map elements within the real-time point cloud or image based on the one or more correspondences established.

Figure 7:
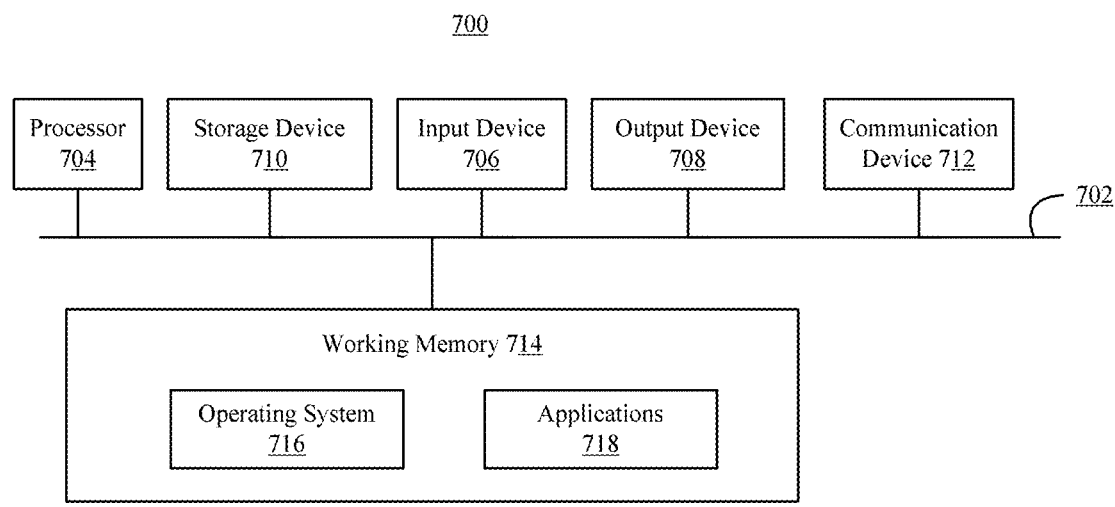
FIG. 7 illustrates a block diagram of computing device which is an example of the hardware device that may be applied to the aspects of the present disclosures in accordance with an exemplary embodiment of the present disclosure.

FIG. 7 illustrates a block diagram of computing device which is an example of the hardware device that may be applied to the aspects of the present disclosures in accordance with an exemplary embodiment of the present disclosure.

With reference to FIG. 7, a computing device 700, which is an example of the hardware device that may be applied to the aspects of the present disclosures, will now be described. The computing device 700 may be any machine configured to perform processing and/or calculations, may be but is not limited to a work station, a server, a desktop computer, a laptop computer, a tablet computer, a personal data assistant, a smart phone, an on-vehicle computer or any in combination. The aforementioned various apparatuses/server/client device may be wholly or at least partially implemented by the computing device 700 or a similar device or system.

The computing device 700 may comprise elements that are connected with or in communication with a bus 702, possibly via one or more interfaces. For example, the computing device 700 may comprise the bus 702, and one or more processors 704, one or more input devices 706 and one or more output devices 708. The one or more processors 704 may be any kinds of processors, and may comprise but are not limited to one or more general-purpose processors and/or one or more special-purpose processors (such as special processing chips). The input devices 706 may be any kinds of devices that can input information to the computing device, and may comprise but are not limited to a mouse, a keyboard, a touch screen, a microphone and/or a remote control. The output devices 708 may be any kinds of devices that can present information, and may comprise but are not limited to display, a speaker, a video/audio output terminal, a vibrator and/or a printer. The computing device 700 may also comprise or be connected with non-transitory storage devices 710 which may be any storage devices that are non-transitory and can implement data stores, and may comprise but are not limited to a disk drive, an optical storage device, a solid-state storage, a floppy disk, a flexible disk, hard disk, a magnetic tape or any other magnetic medium, a compact disc or any other optical medium, a ROM (Read Only Memory), a RAM (Random Access Memory), a cache memory and/or any other memory chip or cartridge, and/or any other medium from which a computer may read data, instructions and/or code. The non-transitory storage devices 710 may be detachable from an interface. The non-transitory storage devices 710 may have data/instructions/code for implementing the methods and steps which are described above. The computing device 700 may also comprise a communication device 712. The communication device 712 may be any kinds of device or system that can enable communication with external apparatuses and/or with a network, and may comprise but are not limited to a modem, a network card, an infrared communication device, a wireless communication device and/or a chipset such as a Bluetooth™ device, 1302.11 device, WiFi device, WiMax device, cellular communication facilities and/or the like.

When the computing device 700 is used as an on-vehicle device, it may also be connected to external device, for example, a GPS receiver, sensors for sensing different environmental data such as an acceleration sensor, a wheel speed sensor, a gyroscope and so on. In this way, the computing device 700 may, for example, receive location data and sensor data indicating the travelling situation of the vehicle. When the computing device 700 is used as an on-vehicle device, it may also be connected to other facilities (such as an engine system, a wiper, an anti-lock Braking System or the like) for controlling the traveling and operation of the vehicle.

In addition, the non-transitory storage devices 710 may have map information and software elements so that the processor 704 may perform route guidance processing. In addition, the output device 706 may comprise a display for displaying the map, the location mark of the vehicle and also images indicating the travelling situation of the vehicle. The output device 706 may also comprise a speaker or interface with an ear phone for audio guidance.

The bus 702 may include but is not limited to Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus. Particularly, for an on-vehicle device, the bus 702 may also include a Controller Area Network (CAN) bus or other architectures designed for application on an automobile.

The computing device 700 may also comprise a working memory 714, which may be any kind of working memory that may store instructions and/or data useful for the working of the processor 704, and may comprise but is not limited to a random access memory and/or a read-only memory device.

Software elements may be located in the working memory 714, including but are not limited to an operating system 716, one or more application programs 718, drivers and/or other data and codes. Instructions for performing the methods and steps described in the above may be comprised in the one or more application programs 718, and the means/units/elements of the aforementioned various apparatuses/server/client device may be implemented by the processor 704 reading and executing the instructions of the one or more application programs 718.

It should also be appreciated that variations may be made in accordance with specific requirements. For example, customized hardware might also be used, and/or particular elements might be implemented in hardware, software, firmware, middleware, microcode, hardware description languages, or any combination thereof. Further, connection to other computing devices such as network input/output devices may be employed. For example, some or all of the disclosed methods and devices may be implemented by programming hardware (for example, a programmable logic circuitry including field-programmable gate arrays (FPGA) and/or programmable logic arrays (PLA)) with an assembler language or a hardware programming language (such as VERILOG, VHDL, C++) by using the logic and algorithm according to the present disclosure.

Although aspects of the present disclosures have been described by far with reference to the drawings, the methods, systems, and devices described above are merely exemplary examples, and the scope of the present disclosure is not limited by these aspects, but is only defined by the appended claims and equivalents thereof. Various elements may be omitted or may be substituted by equivalent elements. In addition, the steps may be performed in an order different from what is described in the present disclosures. Furthermore, various elements may be combined in various manners. What is also important is that as the technology evolves, many of the elements described may be substituted by equivalent elements which emerge after the present disclosure.

What is claimed is:

1. A computer-implemented method for representing a map element, comprising the acts of:
   generating a Gaussian Mixture Model for the map element; generating a signature for identifying the map element, wherein the signature comprises properties of the map element; and
   generating a Signatured Gaussian Mixture Model for representing the map element, wherein the Signatured Gaussian Mixture Model comprises the Gaussian Mixture Model and the signature, and the Signatured Gaussian Mixture Model further comprises a dynamic existence probability of the map element.

2. The method according to claim 1, wherein the map element is a geometry or point cluster in a digital map or an image segment in an image.

3. The method according to claim 1, wherein generating the Gaussian Mixture Model for the map element comprises:
   using Gaussian Mixture Models of geometric primitives to approximate a shape of the map element.

4. The method according to claim 3, wherein the geometric primitives comprise at least one of:
   a line segment, an arc segment, a spiral segment, a planar rectangle, a planar triangle, a planar circle/sphere, a planar ellipse, a sphere surface patch, a cylinder surface patch, a 3D cube, a 3D sphere and a 3D cylinder.

5. The method according to claim 1, wherein the properties of the map element
   comprise at least of one of type, reflectivity and flatness of the map element.

6. A computer implemented method for locating a vehicle/robot, comprising the acts of:
   reading a Signatured Gaussian Mixture Map for a map section which the vehicle/robot is currently located in, wherein the Signatured Gaussian Mixture Map comprises Signatured Gaussian Mixture Models for map elements within the map section, and wherein the Signatured Gaussian Mixture Models are generated by generating a Gaussian Mixture Model for each of the map elements; generating a signature for identifying each of the map elements, wherein each signature comprises properties of a respective map element and generating a Signatured Gaussian Mixture Model for representing each of the map elements, wherein each of the Signatured Gaussian Mixture Models comprises the Gaussian Mixture Model and the signature;
   generating the Signatured Gaussian Mixture Models for the map elements within a real-time point cloud or an image acquired by the vehicle/robot;
   establishing one or more correspondences between the Signatured Gaussian Mixture Map and the Signatured Gaussian Mixture Models for the map elements within the real-time point cloud or image based on signatures of the Signatured Gaussian Mixture Models for the map elements within the real-time point cloud or image; and
   matching the Signatured Gaussian Mixture Map with the Signatured Gaussian Mixture Models for the map elements within the real-time point cloud or image based on the one or more correspondences established.

7. The method according to claim 6, further comprising the act of:
   reading information on the map section which the vehicle/robot is currently located in.

8. The method according to claim 6, further comprising the act of:
   reading information on prior pose of the vehicle/robot and data reflecting the uncertainty area of the prior pose.

9. The method according to claim 6, wherein matching the Signatured Gaussian Mixture Map with the Signatured Gaussian Mixture Models for map elements within the realtime point cloud or image comprises:
   optimizing a Euclidean distance between the Signatured Gaussian Mixture Map and the Signatured Gaussian Mixture Models for map elements within the real-time point cloud or image.

10. The method according to claim 9, wherein optimizing the Euclidean distance between the Signatured Gaussian Mixture Map and the Signatured Gaussian Mixture Models for map elements within the real-time point cloud or image comprises:
    optimizing the Euclidean distance with pose of the vehicle/robot constrained on predefined space and within the uncertainty area.

11. An apparatus for representing a map element, comprising:
    a memory, having computer executable instructions stored therein; and a processor, coupled to the memory and configured to:
    generate a Gaussian Mixture Model for the map element; generate a signature for identifying the map element, wherein the signature comprises properties of the map element; and
    generate a Signatured Gaussian Mixture Model for representing the map element, wherein the Signatured Gaussian Mixture Model comprises the Gaussian Mixture Model and the signature, and the Signatured Gaussian Mixture Model further comprises a dynamic existence probability of the map element.

12. The apparatus according to claim 11, wherein generating a Gaussian Mixture Model for the map element comprises:
    using Gaussian Mixture Models of geometric primitives to approximate a shape of the map element.

13. An apparatus for locating a vehicle/robot, comprising:
    a memory, having computer executable instructions stored therein; and
    a processor, coupled to the memory and configured to:
    read a Signatured Gaussian Mixture Map for a map section which the vehicle/robot is currently located in, wherein the Signatured Gaussian Mixture Map comprises Signatured Gaussian Mixture Models for map elements within the map section, and wherein the Signatured Gaussian Mixture Models are generated by generating a Gaussian Mixture Model for each of the map elements; generating a signature for identifying each of the map elements, wherein each signature comprises properties of a respective map element and generating a Signatured Gaussian Mixture Model for representing each of the map elements, wherein each of the Signatured Gaussian Mixture Models comprises the Gaussian Mixture Model and the signature;

generate the Signatured Gaussian Mixture Models for the map elements within a realtime point cloud or an image acquired by the vehicle/robot;

establish one or more correspondences between the Signatured Gaussian Mixture Map and the Signatured Gaussian Mixture Models for map elements within the realtime point cloud or image based on signatures of the Signatured Gaussian Mixture Models for map elements within the real-time point cloud or image; and match the Signatured Gaussian Mixture Map with the Signatured Gaussian Mixture Models for map elements within the real-time point cloud or image based on the correspondence established.

14. The apparatus according to claim 13, wherein the processor is further configured to:
read information on prior pose of the vehicle/robot and data reflecting the uncertainty area of the prior pose.

15. The apparatus according to claim 13, wherein matching the Signatured Gaussian Mixture Map with the Signatured Gaussian Mixture Models for map elements within the realtime point cloud or image comprises:
optimizing the Euclidean distance between the Signatured Gaussian Mixture Map and the Signatured Gaussian Mixture Models for map elements within the real-time point cloud or image.

16. The apparatus according to claim 15, wherein optimizing the Euclidean distance between the Signatured Gaussian Mixture Map and the Signatured Gaussian Mixture Models for map elements within the real-time point cloud or image comprises:
optimizing the Euclidean distance with pose of the vehicle/robot constrained on predefined space and within the uncertainty area.

17. A non-transient storage medium having instructions stored thereon that when executed cause a processor to implement computer-implemented method for representing a map element, comprising:
instructions for causing the processor to generate a Gaussian Mixture Model for the map element;
instructions for causing the processor to generate a signature for identifying the map element, wherein the signature comprises properties of the map element; and
instructions for causing the processor to generate a Signatured Gaussian Mixture Model for representing the map element, wherein the Signatured Gaussian Mixture Model comprises the Gaussian Mixture Model and the signature, and the Signatured Gaussian Mixture Model further comprises a dynamic existence probability of the map element.

18. A non-transient storage medium having instructions stored thereon that when executed cause a processor to implement computer-implemented method for locating a vehicle/robot, comprising:
instructions for causing the processor to read a Signatured Gaussian Mixture Map for a map section which the vehicle/robot is currently located in, wherein the Signatured Gaussian Mixture Map comprises Signatured Gaussian Mixture Models for map elements within the map section, and wherein the Signatured Gaussian Mixture Models are generated by generating a Gaussian Mixture Model for each of the map elements; generating a signature for identifying each of the map elements, wherein each signature comprises properties of a respective map element and generating a Signatured Gaussian Mixture Model for representing each of the map elements, wherein each of the Signatured Gaussian Mixture Models comprises the Gaussian Mixture Model and the signature;
instructions for causing the processor to generate the Signatured Gaussian Mixture Models for the map elements within a real-time point cloud or an image acquired by the vehicle/robot;
instructions for causing the processor to establish one or more correspondences between the Signatured Gaussian Mixture Map and the Signatured Gaussian Mixture Models for map elements within the real-time point cloud or image based on signatures of the Signatured Gaussian Mixture Models for map elements within the real-time point cloud or image; and
instructions for causing the processor to match the Signatured Gaussian Mixture Map with the Signatured Gaussian Mixture Models for map elements within the real-time point cloud or image based on the one or more correspondences established.

19. An apparatus for representing a map element, comprising:
a Gaussian Mixture Model generation unit configured to generate a Gaussian Mixture Model for the map element;
a signature generation unit configured to generate a signature for identifying the map element, wherein the signature comprises properties of the map element; and
a Signatured Gaussian Mixture Model generation unit configured to generate a Signatured Gaussian Mixture Model for representing the map element, wherein the Signatured Gaussian Mixture Model comprises the Gaussian Mixture Model and the signature, and the Signatured Gaussian Mixture Model further comprises a dynamic existence probability of the map element.

20. An apparatus for locating a first vehicle/robot, comprising:
a Signature Gaussian Mixture Map read unit configured to read Signature Gaussian Mixture Map for a map section which the first vehicle/robot is currently located in, wherein the Signatured Gaussian Mixture Map comprises Signatured Gaussian Mixture Models for map elements within the map section, and wherein the Signatured Gaussian Mixture Models are generated by generating a Gaussian Mixture Model for each of the map elements; generating a signature for identifying each of the map elements, wherein each signature comprises properties of a respective map element and generating a Signatured Gaussian Mixture Model for representing each of the map elements, wherein each of the Signatured Gaussian Mixture Models comprises the Gaussian Mixture Model and the signature;
a Signatured Gaussian Mixture Model generation unit configured to generate the Signatured Gaussian Mixture Models for the map elements within a real-time point cloud or an image acquired by the first vehicle/robot;
a correspondence establishing unit configured to establish one or more correspondences between the Signatured Gaussian Mixture Map and the Signatured Gaussian Mixture Models for map elements within the real-time point cloud or image based on signatures of the Signatured Gaussian Mixture Models for map elements within the real-time point cloud or image; and
a matching unit configured to match the Signatured Gaussian Mixture Map with the Signatured Gaussian Mixture Models for map elements within the real-time point cloud or image based on the one or more correspondences established.

21. A second vehicle comprising the apparatus according to claim 20.

* * * * *